United States Patent [19]

Bayless et al.

[11] 3,861,469

[45] Jan. 21, 1975

[54] TECHNIQUE FOR INSULATING A WELLBORE WITH SILICATE FOAM

[75] Inventors: Jack H. Bayless; Alton R. Hagedorn, both of Houston, Tex.

[73] Assignee: Exxon Production Research Company, Houston, Tex.

[22] Filed: Oct. 24, 1973

[21] Appl. No.: 409,344

[52] U.S. Cl. ............................ 166/303, 166/57
[51] Int. Cl............................................ E21b 43/24
[58] Field of Search .............. 166/272, 303, 302, 57

[56] References Cited
UNITED STATES PATENTS

| | | | |
|---|---|---|---|
| 3,451,479 | 6/1969 | Parker | 166/303 |
| 3,525,399 | 8/1970 | Bayless et al. | 166/303 |
| 3,664,424 | 4/1972 | Penberthy, Jr. et al. | 166/303 |
| 3,664,425 | 4/1972 | Penberthy et al. | 166/303 |

*Primary Examiner*—James A. Leppink
*Attorney, Agent, or Firm*—Lewis H. Eatherton

[57] ABSTRACT

Disclosed herein is a method for thermally insulating a well for use in thermal processes for oil recovery. The well is insulated by boiling a silicate solution in contact with the well tubing to form a coating of alkali metal silicate foam on the tubing. Steam injection is continued without substantial interruption after excess silicate solution is no longer discharged at the surface. Preferably, steam injection is continued until water vapor from the silicate solution is no longer discharged at the surface. Generally, the steam which is injected during this continued period will be injected into an oil-bearing formation to thermally stimulate oil production.

10 Claims, 2 Drawing Figures

PATENTED JAN 21 1975 3,861,469

TECHNIQUE FOR INSULATING A WELLBORE WITH SILICATE FOAM

BACKGROUND OF THE INVENTION

1. Field of the Invention

This invention relates to a process for constructing well elements. More particularly the invention relates to a process for thermally insulating a well.

2. Description of the Prior Art

In the recovery of heavy petroleum crude oils, the industry has for many years recognized the desirability of thermal stimulation as a means for lowering the oil viscosity and thereby increasing the production of oil.

One form of thermal stimulation which has recently received wide acceptance by the industry is a process of injecting steam into the well and into the reservoir. This process is a thermal drive technique where stream is injected into one well which drives oil before it to a second producing well. In an alternative method, a single well is used for both steam injection and production of the oil. The steam is injected through the tubing and into the formation. Injection is then interrupted, and the well is permitted to heat soak for a period of time. Following the heat soak, the well is placed on a production cycle, and the heat fluids are withdrawn by way of the well to the surface.

Steam injection can increase oil production through a number of mechanisms. The viscosity of most oils is strongly dependent upon its temperature. In many cases, the viscosity of the reservoir oil can be reduced by 100 fold or more if the temperature of the oil is increased several hundred degrees. Steam injection can have substantial benefits in recovering even relatively-light, low-viscosity oil. This is particularly true where such oils exist in thick, low permeability sands where present fracturing techniques are not effective. In such cases, a reduction in viscosity of the reservoir oil can sharply increase productivity. Steam injection is also useful in removing wellbore damage at injection and producing wells. Such damage is often attributable to asphaltic or paraffinic components of the crude oil which clog the pore spaces of the reservoir sand in the immediate vicinity of the well. Steam injection can be used to remove these deposits from the wellbore.

Injection of high temperature steam which may be 650°F. or even higher does, however, present some special operational problems. When the steam is injected through the tubing, there may be substantial transfer of heat across the annular space to the well casing. When the well casing is firmly cemented into the wellbore, as it generally is, the thermally induced stresses may result in casing failure. Moreover, the primary object of any stream injection process is to transfer the thermal energy from the surface of the earth to the oil-bearing formation. Where significant quantities of thermal energy are lost as the stream travels through the tubing string, the process is naturally less efficient. On even a shallow well, the thermal losses from the steam during its travel down the tubing may be so high that the initially high temperature superheated or saturated steam will condense into hot water before reaching the formation. Such condensation represents a tremendous loss in the amount of thermal energy that the injected fluid is able to carry into the reservoir.

A number of proposals have been advanced to combat excessive heat losses and to reduce casing temperatures in steam injection processes. It has been suggested that a temperature resistant, thermal packer be employed to isolate the annular space between the casing and injection tubing. Such equipment will reduce heat transfer due to convection between the tubing string and the casing string by forming a closed, dead-gas space in the annulus. Such specialized equipment is not only highly expensive, but does nothing to prevent radiant thermal transfer from the injection tubing.

It has been suggested that the wells be completed with a bitumastic coating. This completion technique utilizes a material to coat the casing which will melt at high temperature. When melting occurs, the casing is free to expand thus preventing the stresses which would otherwise be placed on the casing due to an increase in its temperature. This method has not proven to be universally successful in preventing casing failure. In some instances the formation may contact the casing with sufficient force to prevent free expansion and contraction of the casing during heating and cooling. Under these circumstances casing failure is possible due to the unrelieved stresses. Moreover, such a completion technique does nothing to prevent the loss of thermal energy from injection tubing.

It has been suggested that an inert gas, such as nitrogen, be introduced into the annular space between the casing and tubing and pumped down the annulus to the formation. This method requires, however, a source of gas, means for pumping the gas down the annulus, and means for separating the inert gas from the produced well fluids.

Another means which has been successfully employed to lower heat transfer from steam injection tubing is the heat reflector system. This is a shell of heat-reflective, metal pipe which surrounds the tubing string. It is assembled in joints which are equal in length to the joints of the tubing and run into the hole with the tubing string as an integrated unit. The outer shell may be sealed at the top and bottom to prevent the entry of well fluids into the space between the steam injection tubing and the heat reflective shell. Such a system has utility in preventing the transfer of thermal energy from injection tubing due to radiation, conduction, and convection. Such a system, of course, is relatively expensive since it requires two strings of metallic pipe—the injection tubing and the heat reflective shell. Moreover, the use of the heat reflective shell will reduce the diameter of the tubing which may be effectively employed in any given well. This can be particularly important where multiple strings of tubing are employed in a single well.

A more recent technique involves the in situ formation of silicate foam on a tubing string. In this process the tubing string and packer are run into the well and set into place. Then, an aqueous solution of a water-soluble silicate is introduced into the casing-tubing annulus above the packer. Steam is injected into the tubing string to boil the silicate solution above its boiling point and to deposit a coating of alkali metal silicate foam on the tubing.

While this technique has had very good success, it does present some operational problems. Generally, all of the excess silicate solution is not removed from the annulus by boiling during the insulating process. When the level of the solution in the annulus drops and the boiling point of the solution increases due to loss of solution water, the discharge of excess silicate solution becomes less vigorous and eventually dies. If the remaining solution is left in the annulus after steam injection is terminated, it will tend to solidify into a glasslike, impermeable mass above the packer. When subsequent operations necessitate removal of the tubing and packer from the well, the mass of solidified silicate above the packer will hinder this removal. It has, therefore, been the practice to employ some means for removal of this excess solution after the insulation has formed on the tubing.

While it has been suggested that this excess liquid may be removed from the annular space by employing a reverse circulating device in the tubing and displacing the remaining solution from the annular space, it has been found that this displacement is at times difficult to accomplish. The remaining liquid may be highly viscous and cannot be effectively displaced with a gaseous displacing agent such as natural gas. Nor is water a totally satisfactory displacing agent. Although the dehydrated coating is not instantly soluble in water, it will deteriorate and dissolve when contacted by water for an extended period. Also, the length of time that the coating can resist deterioration by water is reduced by the relatively high temperature existing in the well following boiling of the silicate solution. Since a number of hours would be required to remove a fresh water displacing fluid from the annulus of a deep well, the use of water as a displacing fluid may cause deterioration of the silicate coating.

Other methods which have been suggested to deal with this problem include incorporating a foaming agent in the solution to increase its discharge and displacing the solution with a fluid which has a low solubility for the silicate foam. These techniques are only partially effective and can, in certain instances, increase the cost of the process.

SUMMARY OF THE INVENTION

In the practice of this invention, the annulus of the well between the tubing string and the casing string is filled with an aqueous solution containing a water-soluble silicate. Thermal energy is introduced into the tubing to boil the silicate solution and to deposit a coating of silicate foam on the exterior of the tubing string. During the period that the silicate solution is boiling, the annulus is vented to the atmosphere to discharge water vapor and silicate solution. Steam injection is continued without interruption after silicate solution is no longer discharged through the vent, and the excess silicate solution is permitted to remain in the well above the packer. Preferably, steam injection is continued at least until water vapor from the silicate solution is no longer discharged at the surface. This continued steam injection causes the excess silicate solution to form a porous and permeable mass within the annulus which can be dissolved with water when it is desired to remove the tubing and packer from the well.

Objects of the invention not apparent from the above discussion will become evident upon consideration of the following description of the invention taken in connection with the accompanying drawings.

DESCRIPTION OF THE INVENTION

Figure 1:
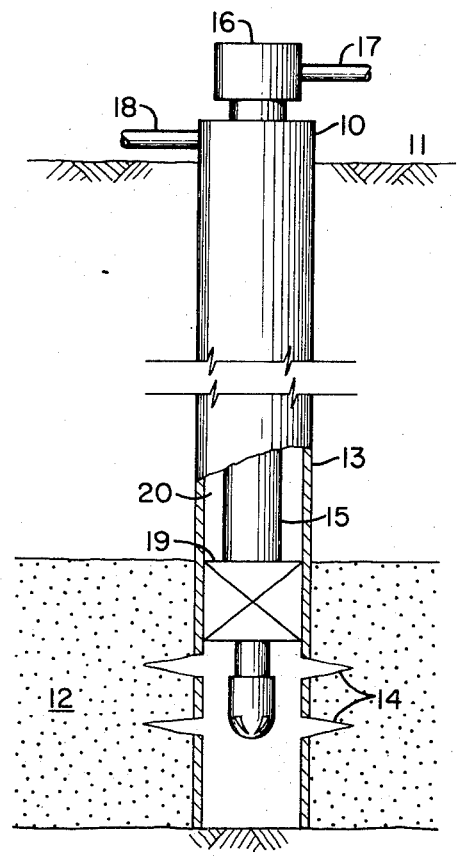
FIG. 1 is a schematic representation of a vertical section of the earth showing a well containing casing and steam injection tubing.

In the embodiment shown in FIG. 1, a well shown generally at 10 is drilled from the surface of the earth 11 to an oil-bearing formation 12. The well has a casing string 13 with perforations 14 in the oil-bearing formation to permit fluid communication between the oil-bearing formation and the casing. Steam injection tubing 15 extends from the wellhead 16 to the oil-bearing formation. The tubing string is equipped with an inlet line 17 and the casing has an inlet line 18. A suitable packer 19 is set on the tubing string and run into the well to the desired level.

After the tubing string with packer assembly is run into the hole and set in place, an aqueous solution of water-soluble silicate is injected through inlet line 18 into the annular space 20 between the casing and tubing. The packer element will prevent the silicate solution from traveling below the packer assembly. Preferably, sufficient solution will be employed to fill the annular space.

Following injection of the silicate solution, steam is introduced into the tubing through inlet line 17, down the tuging string 15, and into the oil-bearing formation through performations 14. The casing inlet 18 is opened to the atmosphere to permit discharge of the water vapor which boils from the silicate solution. It is preferred to inject steam at a relatively high temperature, approximately 600°F., and a relatively high, mass flow rate. The high temperatures and high mass flow rates will permit immediate heating of the tubing string 15 to a high temperature and will rapidly remove water from the silicate solution.

Figure 2:
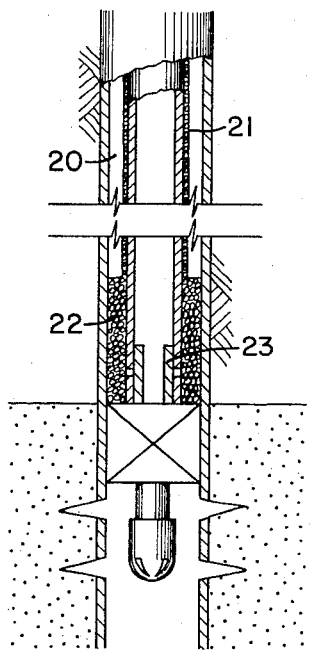
FIG. 2 is a schematic representation of the well after deposition of the silicate foam.

As is shown in FIG. 2 as the solution boils, a thin film of alkali metal silicate foam 21 is formed on the exterior of the tubing string. While the foam is being deposited on the tubing, excess silicate solution will generally be discharged through vent line 18. However after a period of boiling, no appreciable quantity of silicate solution will be discharged through this vent line, and a substantial quantity of excess silicate solution may remain in annular space 20 above packer 19.

It has been found that the excess silicate solution will form a porous and permeable mass 22 in at least a portion of the vertical extent of the annulus above the packer if steam injection is continued without interruption until the solution solidifies. Contrary to prior results which indicated that the excess solution would form an impermeable solid of low water solubility, the exccess solution can produce a highly permeable foam which can be effectively contacted with and dissolved by water. When it is necessary to remove the foamed mass 22, a blanking plug is run through the tubing and seated on a landing nipple near the packer. A reverse circulation means 23, such as a wire line actuated gas lift valve or sliding sleeve, above the packer is opened to establish fluid communication between the tubing and the annulus. Water can then be circulated through mass 22 and dissolved within a short period of time. Even when the mass is not totally dissolved, its mechanical strength can be reduced to the point that the packer and tubing can be pulled with little difficulty.

It is preferred to contact the mass 22 by circulating water down the tubing, out the reverse circulating means 23, and up the annulus. When the circulation is conducted in this manner, the mass of silicate 22 is contacted with water which is free of dissolved silicate. Conversely when the circulation is down the annulus and up the tubing, the water has been in contact with the foam 21 on the tubing and may have a substantial amount of silicate in solution when it contacts mass 22. This silicate in solution would, of course, retard the rate at which the silicate mass 22 would be dissolved. It should be understood, however, that circulation of water in either manner through the mass of silicate is not an absolute requisite to its removal. Simply spotting water in the annulus will, generally, dissolve the mass enough to permit the packer and tubing to be pulled. However, it will be recognized that the lack of circulation through the silicate mass will retard its deterioration.

As was previously discussed, steam injection is continued without any significant interruption after excess silicate solution is no longer discharged through the surface vent line. Preferably, the steam injection period is continued until water vapor from the silicate solution is no longer discharged through vent line 18. The absence of water vapor issuing from vent line 18 will tend to indicate that the excess silicate solution has solidified. Conveniently, the steam injected into the formation while the excess silicate solution is solidifying may be used for oil recovery purposes. For example, the well may be subjected to a "huff-and-puff" stimulation technique where steam is introduced through the insulated tubing and into the formation to heat the oil and lower its viscosity. Typically, the steam injection period in such a technique may be several weeks or longer. Such a period will be long enough in almost all instances for the excess silicate solution to form a porous and permeable mass of silicate. In such a recovery technique, the well is normally shut in for a period of time following steam injection to permit the formation to "heat soak." During this soak period the latent heat of condensation of the steam is transferred from the steam mass to the formation and the oil which it contains. This increase in heat content of the oil can drastically reduce its viscosity which will enable more efficient production. After the soak period, the injection well is placed on production and heated fluids including oil, water, and steam, are withdrawn from the formation by means of the well. Alternatively, the well might be used for a steam drive process. In this process, steam is introduced by means of one well and into an oil-bearing formation. Heated steam with or without a displacing fluid is driven through the formation to heat the oil ahead of it. Heated oil, water, and steam are withdrawn from the formation by means of an offset producing well. The steam injection period in a steam drive process may be even longer than in a "huff-and-puff" stimulation. This ejection period can be months or even longer which will be more than sufficient to cause the excess silicate solution to form a porous and permeable mass.

The silicate employed in the practice of this invention are those of the alkali metals which readily dissolve in water. This group is commonly termed the soluble silicates and includes any of the silicates of the alkali metals, with the exception of lithium. However, in the practice of this invention, it is preferred to employ silicate solutions containing sodium or potassium, as the alkali metal, due to the relatively low cost and ready commercial availability of such solutions.

When water is removed from the solutions of the soluble silicates, they crystalize to form glass-like materials. When the soluble silicates are dried rapidly at boiling temperatures, the solutions intumesce and form a solid mass of bubbles having 30–100 times their original volume. The dried foam is a light weight glassy material having excellent structural and insulating properties.

In the practice of this invention, commercially available sodium silicate solutions have been found suitable. Such solutions have a density of approximately 40°Be. at 20°C. and a silica dioxide/sodium oxide weight ratio of approximately 3.2/1. Alternatively, commercially available potassium silicate solutions have a density of approximately 30°Be. at 20°C. and a silica dioxide/potassium oxide weight ratio of approximately 2.4/1. The silica dioxide/alkali metal oxide weight ratio is not critical to the practice of this invention and may range between 1.3/1 and 5.0/1. The density of the solutions may range between 22°Be. and 50°Be. at 20°C. It is only important that sufficient solids be contained in the solution so that upon boiling a coating of approximately one-eighth of an inch or greater will be deposited upon the tubing string.

The principle of the invention and the manner in which it is contemplated to apply that principle have been described. It is to be understood that the foregoing is illustrative only and that other means and techniques can be employed without departing from the true scope of the invention as defined in the following claims.

What we claim is:

1. A process for thermally insulating a tubing string suspended within a wellbore which comprises injecting into the wellbore-tubing string annular space a solution consisting essentially of water and a water-soluble silicate, introducing thermal energy into the tubing string to remove water from the solution and to deposit a coating of silicate on the tubing string, venting the annular space between the tubing string and the wellbore to discharge water vapor removed from the solution and to discharge excess silicate solution from the annulus, continuing the introduction of thermal energy into the tubing string until excess silicate solution remaining in the annulus forms a porous, permeable, and water-soluble mass which occupies the space between the wellbore and the tubing for at least a portion of the vertical extent of the space.

2. A process as defined in claim 1 wherein the thermal energy introduced into the tubing string is steam.

3. A process as defined in claim 1 wherein the water-soluble silicate is a potassium silicate.

4. A process as defined in claim 1 wherein the water-soluble silicate is a sodium silicate.

5. A process as defined in claim 1 wherein the water-soluble silicate has a density from 22° to 50° Be. at 20°C. and a silicate oxide/alkali metal oxide weight ratio of from 1.3/1 to 5.0/1.

6. The process for thermally insulating a tubing string suspended within a wellbore which comprises injecting a solution consisting essentially of water and a water-soluble silicate into the wellbore-tubing string annular space, introducing thermal energy into the tubing string to remove water from the solution and to deposit a coating of silicate on the tubing string, venting the annular space between the tubing string and the wellbore to discharge water vapor from the solution and to discharge excess silicate solution from the annulus, and continuing the introduction of thermal energy into the tubing string without substantial interruption until water vapor removed from the solution is no longer discharged from the annular space.

7. A well operation for a well containing tubing suspended within a wellbore which penetrates an oil-bearing formation which comprises injecting a solution consisting essentially of water and a water-soluble silicate into the annular space defined by the tubing string and the wellbore, introducing thermal energy through the tubing string and into the formation to remove water from a solution and to deposit a coating of silicate on the tubing string, venting the annular space between the tubing string and the wellbore to discharge water vapor removed from the solution and to discharge excess silicate solution from the annulus, continuing the introduction of thermal energy through the tubing string and into the formation without substantial interruption after water vapor is no longer vented from the annular space to heat the oil within the oil-bearing formation and reduce its viscosity, and recovering oil from the formation.

8. A well operation as defined in claim 7 in which the oil is recovered from the formation by means of the tubing string.

9. A well operation as defined in claim 7 wherein oil is recovered from the formation by means of an offset producing well.

10. A well operation for a well containing a tubing string suspended within a casing string and containing a packer disposed upon said tubing string and in contact with said casing string to seal the casing-tubing annular space above an oil-bearing formation which is penetrated by said well which comprises filling at least a portion of the annulus above said packer with a solution consisting essentially of water and a water-soluble silicate, injecting steam down the tubing and into the formation to boil the silicate solution and to deposit a coating of silicate foam on the exterior of the tubing, venting the annulus to discharge water vapor removed from the solution and to discharge excess silicate solution from the annulus, continuing injection of the steam through the tubing without substantial interruption until the water vapor is no longer discharged at the surface and until excess silicate solution remaining in the annulus above said packer forms a porous and permeable water-soluble mass within a portion of the vertical extent of the annulus, removing oil from the formation, and then contacting the porous and permeable, water-soluble mass with water to cause said mass to deteriorate and to permit said tubing and packer to be removed from said well.

* * * * *